(12) United States Patent
Toporek et al.

(10) Patent No.: US 7,054,902 B2
(45) Date of Patent: May 30, 2006

(54) MULTICAST DELIVERY SYSTEMS AND METHODS

(75) Inventors: Jerome D. Toporek, Venice, CA (US); Timothy W. Hartrick, Los Angeles, CA (US); James A. Krupp, Amherst, MA (US); Michael A. Saul, Los Angeles, CA (US)

(73) Assignee: Packeteer, Inc., Cupertino, CA (US)

( * ) Notice: Subject to any disclaimer, the term of this patent is extended or adjusted under 35 U.S.C. 154(b) by 699 days.

(21) Appl. No.: 09/999,777

(22) Filed: Oct. 23, 2001

(65) Prior Publication Data
US 2003/0079022 A1 Apr. 24, 2003

(51) Int. Cl.
*G06F 15/16* (2006.01)
(52) U.S. Cl. .................. 709/203; 709/227
(58) Field of Classification Search .......... 370/230, 370/235; 709/203, 217, 233
See application file for complete search history.

(56) References Cited

U.S. PATENT DOCUMENTS

| 5,014,265 A | 5/1991 | Hahne et al. |
| 5,163,046 A | 11/1992 | Hahne et al. |
| 5,313,454 A | 5/1994 | Bustini et al. |
| 5,426,635 A | 6/1995 | Mitra et al. |
| 5,572,530 A | 11/1996 | Chitre et al. |
| 5,594,490 A | 1/1997 | Dawson et al. |
| 5,784,358 A | 7/1998 | Smith et al. |
| 5,850,517 A | 12/1998 | Verkler et al. |
| 5,852,721 A | 12/1998 | Dillon et al. |
| 5,896,558 A | 4/1999 | Wiedeman |
| 5,897,622 A | 4/1999 | Blinn et al. |
| 5,912,883 A | 6/1999 | Hershberg |
| 5,968,129 A | 10/1999 | Dillon et al. |
| 5,995,725 A | 11/1999 | Dillon |
| 5,995,726 A | 11/1999 | Dillon |
| 6,016,388 A | 1/2000 | Dillon |
| 6,038,216 A | 3/2000 | Packer |
| 6,098,108 A | 8/2000 | Scidhar et al. |
| 6,101,189 A | 8/2000 | Tsuruoka |
| 6,115,384 A | 9/2000 | Parzych |
| 6,130,880 A | 10/2000 | Naudus et al. |
| 6,138,144 A | 10/2000 | DeSimone et al. |
| 6,161,141 A | 12/2000 | Dillon |

(Continued)

FOREIGN PATENT DOCUMENTS

DE 19910023 C2 9/2000

(Continued)

OTHER PUBLICATIONS

Tim Sayer, *A Brief Introduction to the Xpress Transport Protocol*, http://www.ca.sandia.gov. Dec. 23, 1998, pp. 1-3.

(Continued)

*Primary Examiner*—Zarni Maung
*Assistant Examiner*—Karen Tang
(74) *Attorney, Agent, or Firm*—Mark J. Spolyar (57) ABSTRACT

The present invention is directed to systems and methods for efficient and effective multicast delivery over hub and spoke networks, including satellite-based hub and spoke networks. In one embodiment, a method of establishing a multicast connection with a plurality of receiving stations includes receiving with a gateway port a unicast connection, such as a TCP connection, from a sending station, mapping the unicast connection to a multicast connection on a first multicast group IP address, and initiating the multicast connection to a plurality of receiving stations. In alternative embodiments, the multicast connection is established over a satellite link, and/or is unidirectional.

9 Claims, 10 Drawing Sheets

U.S. PATENT DOCUMENTS

| | | | |
|---|---|---|---|
| 6,215,776 B1 | 4/2001 | Chao | |
| 6,229,809 B1 | 5/2001 | Murphy et al. | |
| 6,259,701 B1* | 7/2001 | Shur et al. | 370/401 |
| 6,292,839 B1 | 9/2001 | Naudus et al. | |
| 6,298,041 B1 | 10/2001 | Packer | |
| 6,324,582 B1 | 11/2001 | Sridhar et al. | |
| 6,338,131 B1 | 1/2002 | Dillon | |
| 6,385,175 B1 | 5/2002 | Dove | |
| 6,415,329 B1 | 7/2002 | Gelman et al. | |
| 6,519,651 B1 | 2/2003 | Dillon | |
| 6,654,344 B1* | 11/2003 | Toporek et al. | 370/230 |
| 6,834,039 B1* | 12/2004 | Kelly et al. | 370/229 |
| 2004/0010616 A1* | 1/2004 | McCanne | 709/238 |

FOREIGN PATENT DOCUMENTS

| | | |
|---|---|---|
| EP | 0890907 A1 | 1/1999 |
| JP | 08-114385 | 10/1997 |
| JP | 09-284343 | 10/1997 |
| JP | 10-143449 | 12/1999 |
| JP | 11-341072 | 12/1999 |
| WO | WO 97/20413 A1 | 6/1997 |
| WO | WO 98/20724 A2 | 5/1998 |
| WO | WO 98/47166 | 10/1998 |
| WO | WO 00/46669 | 8/2000 |

OTHER PUBLICATIONS

Ron Voruganti et al., *Impact of Satellite Delay on Protocol Performance for ATM Traffic Over Non-processing Satellites*, IEEE, 1994, pp. 66, 69, 71 and 72.

Alfred C. Weaver, *Xpress Transport Protocol Version 4*, Department of Computer Science, University of Virginia, Charlottesville, Virginia 22903, 1992, pp. 165-174.

Peter J. Brown, *Global Solution Now,Via Satellite*, Oct. 1998, pp. 17, 19, 20, 22, 24, 26, 27, and 28.

Raj Yavatkar and Namrata Bhagawat, *Improving End-to-End Performance of TCP over Mobile Internetworks*, IEEE, 1995, pp. 146-152.

B. R. Badrinath et al., *Handling Mobile Clients: A Case for Indirect Interaction*, Department of Computer Science, Rutgers University. New Brunswick, NJ 08903, 4th Workshop on Workstation Operating Systems, Oct., 1993, 7-pages.

Ajay Bakre and B. R. Badrinath, *I-TCP: Indirect TCP for Mobile Hosts*, Department of Computer Science, Rutgers University, Piscataway, NJ 08855, Oct. 1994, pp. 1-18.

Markku Kojo et al., *Connecting Mobile Workstations to the Internet Over a Digital Cellular Telephone Network*, University of Helsinki, Department of Computer Science, Helsinki, Finland, Sep. 1994, pp. 1-16.

Rogers, Amy, *Bandwidth Bargain (Structured Internetworks and Fourelle Systems Inc. Introduce Products That Can Save Bandwidth and Eliminate or Postpone the Need for Installing a T1 Line)*, CommunicationsWeek, Jul. 21, 1997, p. 1.

Lapolla, Stephanie, *Speeding Links to ISPs. (Fourelle Systems Inc. Introduces New Compression Technology) (Brief Article) (Product Announcement)*, PC Week, Aug. 18, 1997, vol. 14, No. 35, p. 134.

O'Shea, Dan, *Compress and Conquer, Telephony*, Oct. 20, 1997, vol. 233, No. 16, p. 26.

Glenn, Patrick, *Fourelle's Venturi Compression Technology Adopted by Wireless Internet Industry Leaders*, Business Wire, Oct. 27, 1997, p. 10270175.

Fourelle Systems Inc., *Wireless: Independent Tests Confirm Wireline/wireless Performance of Fourelle's Compression Technology. (Fourelle Systems Inc's Venturi Technology) (Product Information)*. EDGE: Work-Group Computing Report, vol. 8, pp. 20-21.

Garcia, Martha L., *Fourelle's Venturi Quadruples Performance on WISP Inc.—Wireless Internet Service Providers—Customer Network*, Business Wire, Aug. 6, 1998, p. 8061017.

Flash Networks Ltd., *Flash Networks Announce Availability of BoosterWare for Unix Enhanced Communications of up to 500%*, PR Newswire, May 27, 1998, p. 527HSW001A.

Rogers, Amy, *Slow Modem Blues? (Flash Networks Adds to its Boosterware line of IP Offerings; Xircom lauches 56-kilobit per second upgrade for its modems)*, CommunicationsWeek, Jun. 23, 1997, p. 23.

Flash Networks Ltd., *Achieve Internet Access in a Flash*, Lan Times, Jul. 21, 1997, vol. 14, No. 15, p. 37.

Flash Networks Ltd., *TCP/IP Software, Data Communications*, Nov., 1997, vol. 26, No. 15, p. 48H.

Flash Networks Ltd., *SatBooster Enhances Internet Communications Over Satellite Links by up to Five Times; Booster Ware Technology Speeds TCP/IP Satellite Transmissions*, Business Wire, Dec. 10, 1997, p. 12100059.

Roberts, Erica., *Torquing Up; TCP/IP, Data Communications*, Jan., 1998, vol. 27, No. 1, p. 42.

MIT Lincoln Labs, *Satellite and LMDS React Differently to Latest Spectrum-Sharing Proposal*, Satellite Week, Apr. 3, 1995.

Vicki Johnson and Marjory Johnson, *How IP Multicast Works*, IP Multicast Initiative, www.ipmulticase.com/community/whitepapers/howipmcworks.html, Oct. 10, 2001.

* cited by examiner

MULTICAST DELIVERY SYSTEMS AND METHODS

CROSS-REFERENCES TO RELATED APPLICATIONS

The subject application is related to International Application Serial Number PCT/US00/02891, filed Feb. 2, 2000, in the name of Jerome D. Toporek et al., titled, "Internet Over Satellite," the complete disclosure of which is incorporated herein by reference.

The above noted and incorporated International Application claims priority from the following six commonly-owned co-pending applications, which also are incorporated herein by reference:

1. U.S. Provisional Patent Application Ser. No. 60/118,227, filed Feb. 2, 1999 in the name of Jerome D. Toporek et al., titled, "Internet Over Satellite Apparatus,";
2. U.S. patent application Ser. No. 09/243,185, filed Feb. 2, 1999, in the name of Jerome D. Toporek et al., titled, "Internet Over Satellite System,";
3. U.S. patent application Ser. No. 09/243,554, filed Feb. 2, 1999, in the name of Jerome D. Toporek et al., titled, "Internet Over Satellite Method,";
4. U.S. patent application Ser. No. 09/306,678, filed May 6, 1999, in the name of Jerome D. Toporek et al., titled, "Method and System for Managing Memory in an Internet Over Satellite Connection,";
5. U.S. patent application Ser. No. 09/306,236, filed May 6, 1999, in the name of Jerome D. Toporek et al., titled, "Method and System for Controlling Data Flow in an Internet Over Satellite Connection,"; and
6. U.S. patent application Ser. No. 09/493,338, filed Jan. 28, 2000, in the name of Jerome D. Toporek et al., titled, "Internet Over Satellite Apparatus,"and which also claims priority from U.S. Provisional Patent Application No. 60/118,227.

BACKGROUND OF THE INVENTION

The present invention is directed to multicast delivery systems and methods, and more specifically, to systems and methods for efficient and effective multicast delivery over hub and spoke networks, including satellite-based hub and spoke networks.

Figure 1:
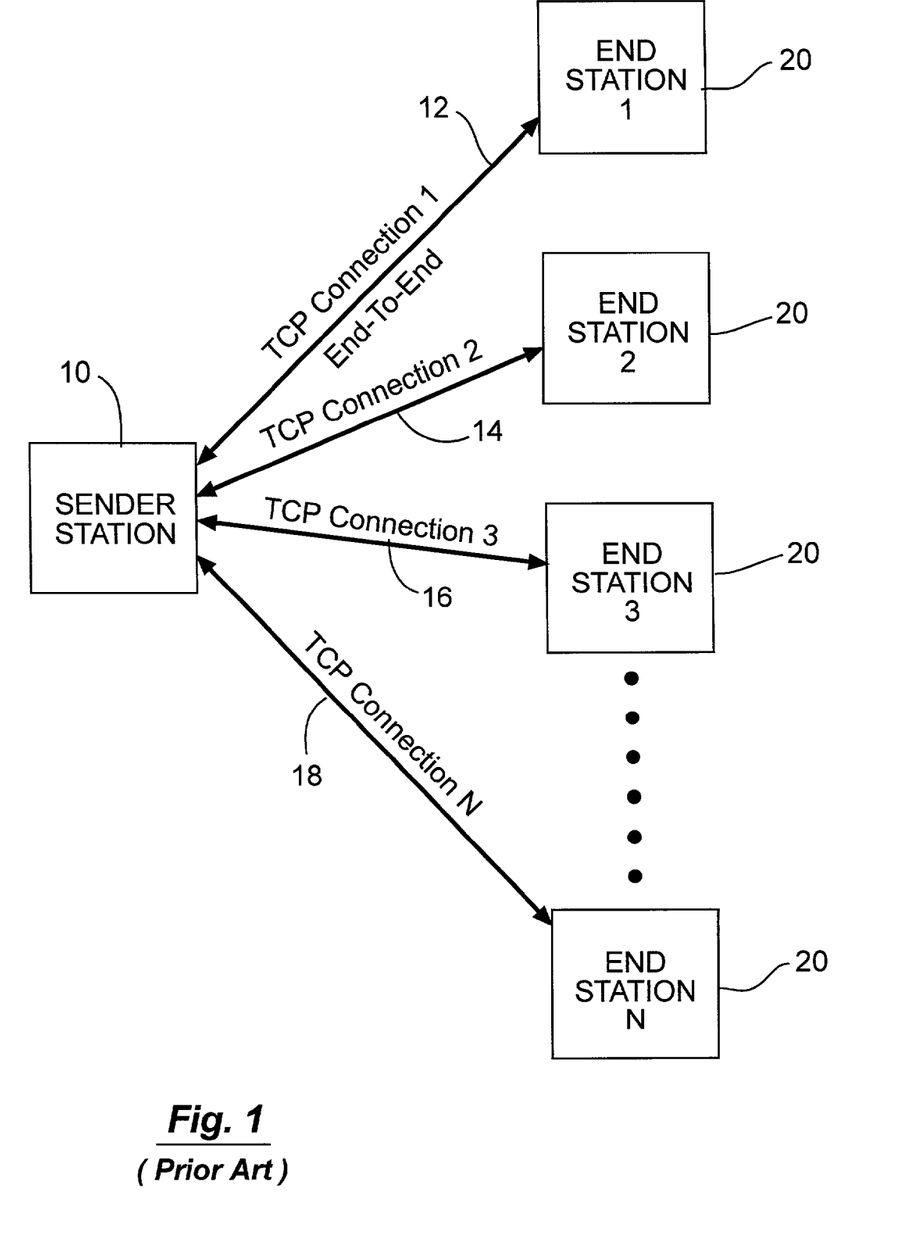
FIG. 1 is a simplified schematic of a prior art multicast connection scheme.

Reliable data delivery over computer networks traditionally relies on unicast data transfers, which establish point-to-point connections between devices. In situations where the same data is transferred to multiple users, the server sends a copy of the file to each recipient independently. The unicast delivery of the same content to a number of remote sites is both time consuming and wasteful of bandwidth resources. A simplified example is shown in FIG. 1, which indicates a sender station 10 establishes individual TCP connections 12–18 with an N number of end stations 20. As shown, sender station 10 establishes a unicast connection with each end station 20.

An alternative to establishing a unicast connection for each end station involves the use of multicast technology. Multicast technology transmits a single data stream to multiple recipients. However, multicast capability built into the internet protocol (IP) is typically a user datagram protocol (UDP) based, best effort service. This service tends to be unreliable, and is typically appropriate only for real-time streaming applications such as video conferencing and event broadcasting. Further, UDP-based IP multicast does not include mechanisms for the detection and retransmission of lost or corrupted data, or the resequencing of packets that arrive at the receiver out of order. For at least these reasons, IP multicast is typically ill suited for file downloads and other data transfer applications.

Attempts to overcome the problems inherent in unreliable UDP-based multicast transmission include the use of forward error correction applications that attempt to increase the probability that all the data will arrive at each receiver. However, such applications require additional bandwidth utilization. Further, the applications require the loading of software onto each device that will act as a multicast sender or receiver. Additional problems with current multicast options also exist, which hinder their use with common TCP applications.

Similar problems for satellite-based, hub and spoke networks exist for multicast distribution. However, certain features of satellite-based networks make them particularly well-suited for using multicast services. Such satellite-based networks typically attempt data delivery using a broadcast mechanism, such as digital video broadcast (DVB). As a result, every data packet is automatically transmitted from the hub to every spoke or remote receiver site, whether the packet is destined for that remote site or not. This makes such satellite-based networks useful for multicast data services because all remote sites receive every packet. Hence, it would be desirable to make use of these attributes while simultaneously making improvements over the current state of unicast and multicast transmissions.

BRIEF SUMMARY OF THE INVENTION

The present invention is directed to systems and methods for efficient and effective multicast delivery over hub and spoke networks, including satellite-based hub and spoke networks.

In one embodiment of the present invention, a method of establishing a multicast connection with a plurality of receiving stations includes receiving a unicast connection (such as a TCP connection) from a sending station, mapping the unicast connection to a multicast connection on a multicast group IP address, and initiating the multicast connection to a plurality of receiving stations. In alternative embodiments, the multicast connection is established over a satellite link, and/or provides unidirectional data transfer.

In one aspect, the sending station includes a computer. In another aspect, the method further includes establishing a plurality of second unicast connections with a plurality of end stations. Such an aspect may include each receiving station establishing a unicast connection with a unique end station. In one aspect, the unicast connection comprises a first protocol and the multicast connection comprises a second protocol. In another aspect, the second unicast connections also comprise the first protocol. In alternative aspects, the unicast connection is a TCP connection, and the multicast connection is a modified XTP connection.

The present invention further includes methods and systems for establishing a multicast FTP connection. In one embodiment, such a method includes receiving a unicast TCP connection from a sender application with a gateway hub and forming a multicast connection from the gateway hub to a plurality of remote gateways. A list of receivers is received from the remote gateways. The method includes forming a data connection with the sender application, and sending a data package received from the data connection to the plurality of remote gateways via the multicast connection.

In one aspect, the method includes forming a control connection between the plurality of remote gateways and a plurality of end stations, and transmitting the data package, such as a file, from the remote gateways to the end stations. In another aspect, the method further includes receiving a plurality of status reports from the remote gateways and transmitting same to the sender application. The status reports include, in one aspect, an identification of one or more end stations that received the data package. In this manner, the sender application is made aware of which end stations received the data package.

In one embodiment, a communication apparatus according to the present invention includes a TCP interface, a remote gateway interface, and a system memory. A bus interconnects the TCP interface, remote gateway interface, and system memory with a processor. The processor is operatively disposed to receive a unicast connection from a sending station, map the unicast connection to a multicast connection on a multicast group IP address, and initiate the multicast connection to a plurality of receiving stations.

In another embodiment, the present invention provides an apparatus for establishing a communication between a sending station and a plurality of receiving stations. The apparatus includes a network interface for receiving a unicast communication from the sending station, a processor for mapping the unicast connection to a multicast connection, and a satellite gateway interface for initiating the multicast connection to a plurality of receiving stations.

In another embodiment of the present invention, a method of establishing a multicast connection with a plurality of end stations includes listening for a multicast connection request, accepting the multicast connection request with a remote gateway, and sending a unicast connection request to one of the end stations. The method further includes reading from the multicast connection and writing to the unicast connection if the end station accepts the unicast connection request, ending the unicast connection, and writing a status report to the multicast connection.

In one aspect, the status report includes an end station identification. In another aspect, the multicast connection request is accepted by a plurality of remote gateways. In a related aspect, each of the remote gateways sends a unicast connection request to a different end station, so that a plurality of end stations may receive the data or file.

Other objects, features and advantages of the present invention will become more fully apparent from the following detailed description, the appended claims and the accompanying drawings.

DETAILED DESCRIPTION OF THE INVENTION

Multicast delivery systems and methods of the present invention are adapted to provide a number of independent multicast services. The present invention systems and methods will find use in, for example, file transfers, cache replication, video file distribution, content delivery networks, database replication, software updates, and other distributions of data and/or files to multiple users over a wide area network and/or a satellite link.

Figure 2:
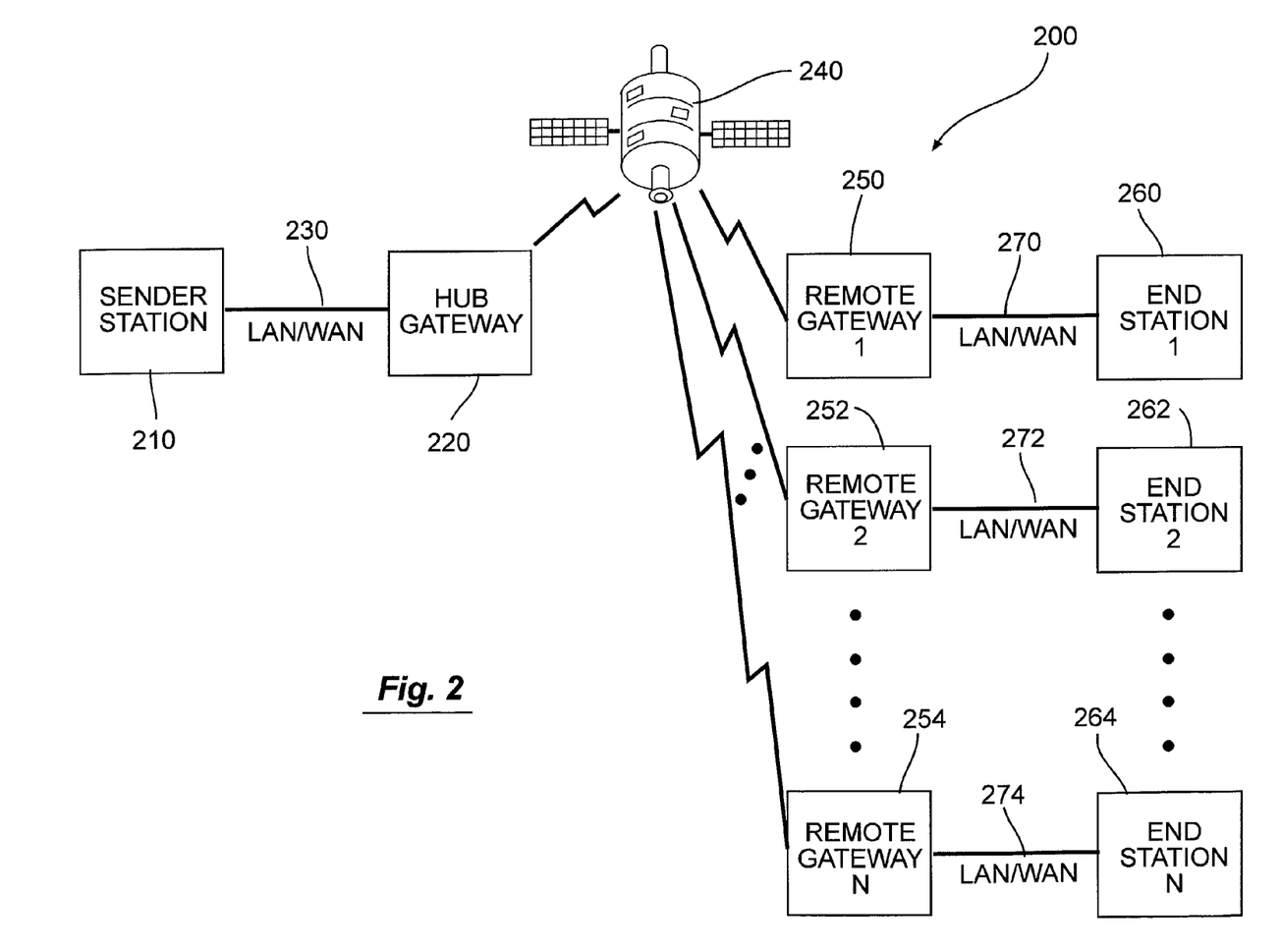
FIG. 2 depicts a simplified schematic of a multicast network and connection design according to the present invention.
Figure 3:
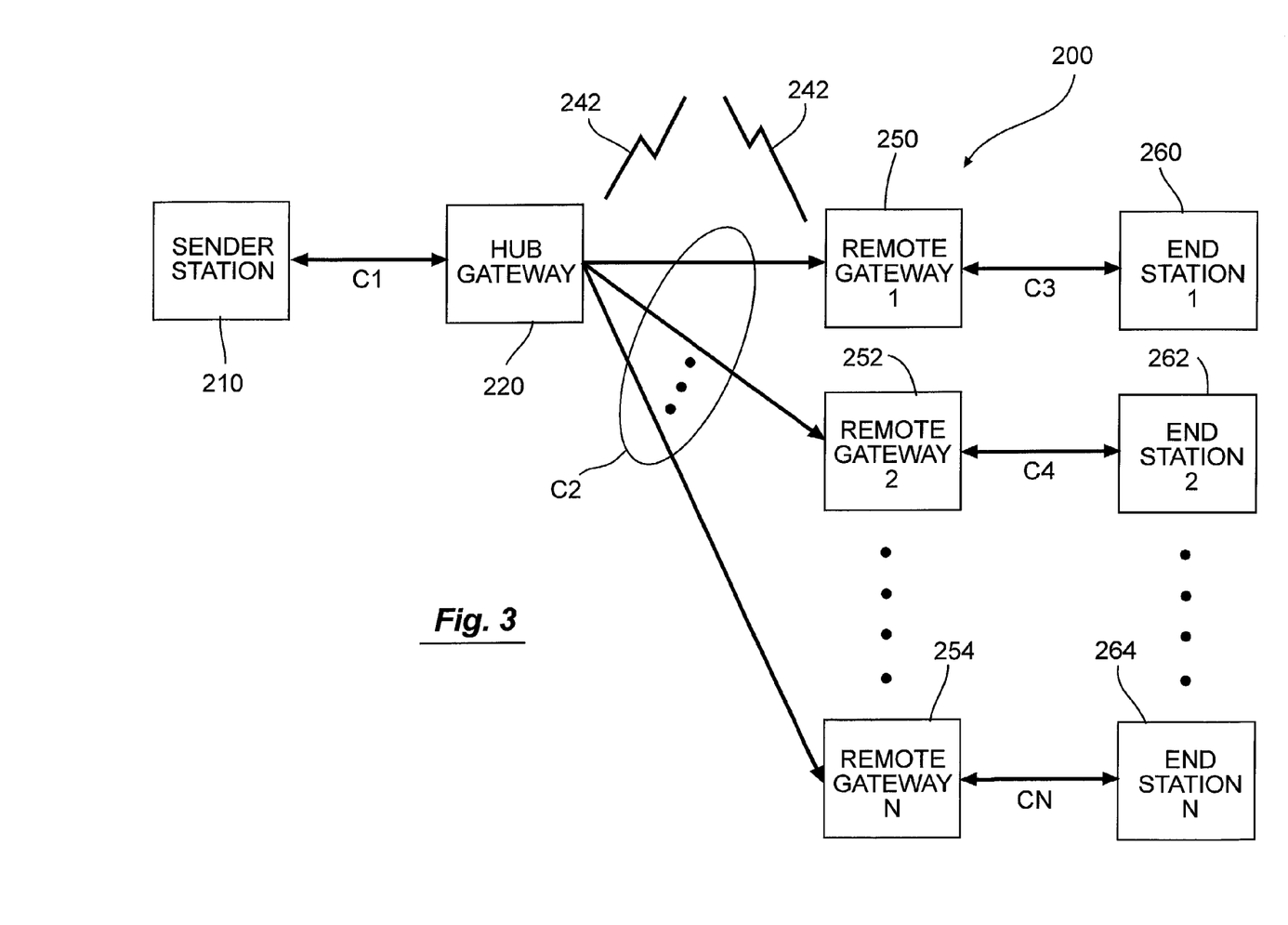
FIG. 3 depicts a multicast network and connection diagram for an alternative embodiment of the present invention.

Turning now to FIGS. 2 and 3, embodiments of the present invention will be described. FIGS. 2 and 3 are directed to a general multicast facility, designed to support one-way data transfer from an application to a recipient, such as for most TCP data push applications. The systems and associated methods of FIGS. 2–5 will be useful for applications such as database synchronization, cache replication, and the like.

FIG. 2 depicts a system 200 comprising a sender station 210 and a hub gateway 220. Sender station 210 may comprise a regular personal computer (PC) or a work station, running an unmodified operating system such as Windows, Solaris, Linux, or the like. In one embodiment, hub gateway 220 is a SkyX Gateway XH45, available commercially from Mentat Inc., based in Los Angeles, Calif. Sender station 210 initiates a TCP connection with hub gateway 220 by way of a local area network (LAN) or a wide area network (WAN) 230. A reliable multicast connection is then established between hub gateway 220 and one or more remote gateways. In one embodiment a multicast connection is established with N remote gateways, represented by a remote gateway 250, a remote gateway 252 and a remote gateway 254 in FIG. 2. In one embodiment, each remote gateway 250–254 is a SkyX Gateway XH45 or a SkyX Gateway XR10, both commercially available from Mentat Inc.

The multicast service is initiated by sender station 210 initiating a TCP connection with hub gateway 220 using a service port number. A number of independent multicast services are available within the scope of the present invention, with each specified on hub gateway 220 by a unique TCP port number and multicast IP address.

Hub gateway 220 then establishes a reliable multicast connection (C2) with remote gateways 250–254. For the embodiment shown in FIG. 2, the multicast connection is established by way of a satellite 240 across a satellite link 242 using the service IP multicast group address.

In one embodiment, multicast connection C2 is established using an Xpress Transport Protocol (XTP), a modified XTP, or other reliable multicast protocol. In a particular embodiment, the multicast functionality of the present invention is built into the transport layer of Mentat's SkyX protocol. Further details on modified XTP and other appropriate protocols are described in International Application No. PCT/US00/02891, the complete disclosure of which has been previously incorporated herein by reference.

Remote gateways 250–254 are configured to listen to the IP multicast group address and, if desired, join the multicast group. Remote gateways 250–254 open a unicast TCP connection, using the service port number, to end stations 260–264, respectively. In one embodiment, the unicast TCP connection between the remote gateways and end stations are established via one or more LAN or WAN 270–274. Once the multicast group has been formed, hub gateway 220 receives data over the TCP connection (C1) from sender station 210, and transmits the data to all remote gateways 250–254 in the multicast group. Each remote gateway 250–254 then transfers the data to each appropriate end station 260–264.

Individual groups, differentiated by IP multicast group address, can be used to specify different end stations 260–264 for different applications. For example, inventory data may be sent to the local database client, cache data may be directed to the local proxy cache, and video files may be transferred to the local video server, each represented by one or more end stations 260–264. Further, separate groups can also be used to differentiate between classes of end stations 260–264 so that particular files are only received by those sites.

FIG. 3 depicts system 200 similar to that shown in FIG. 2, except connection C2 may be established over a wide area network (WAN). As shown in FIG. 3, some or all of the multicast connection may be transferred over a satellite as shown by link 242. In one embodiment, hub gateway 220 initiates the multicast connection (C2) directly to remote gateways 250–254, such as over link 242. Remote gateways 250–254 then establish a unicast connection (C3, C4, . . . CN) with each end station 260–264.

Figure 4:
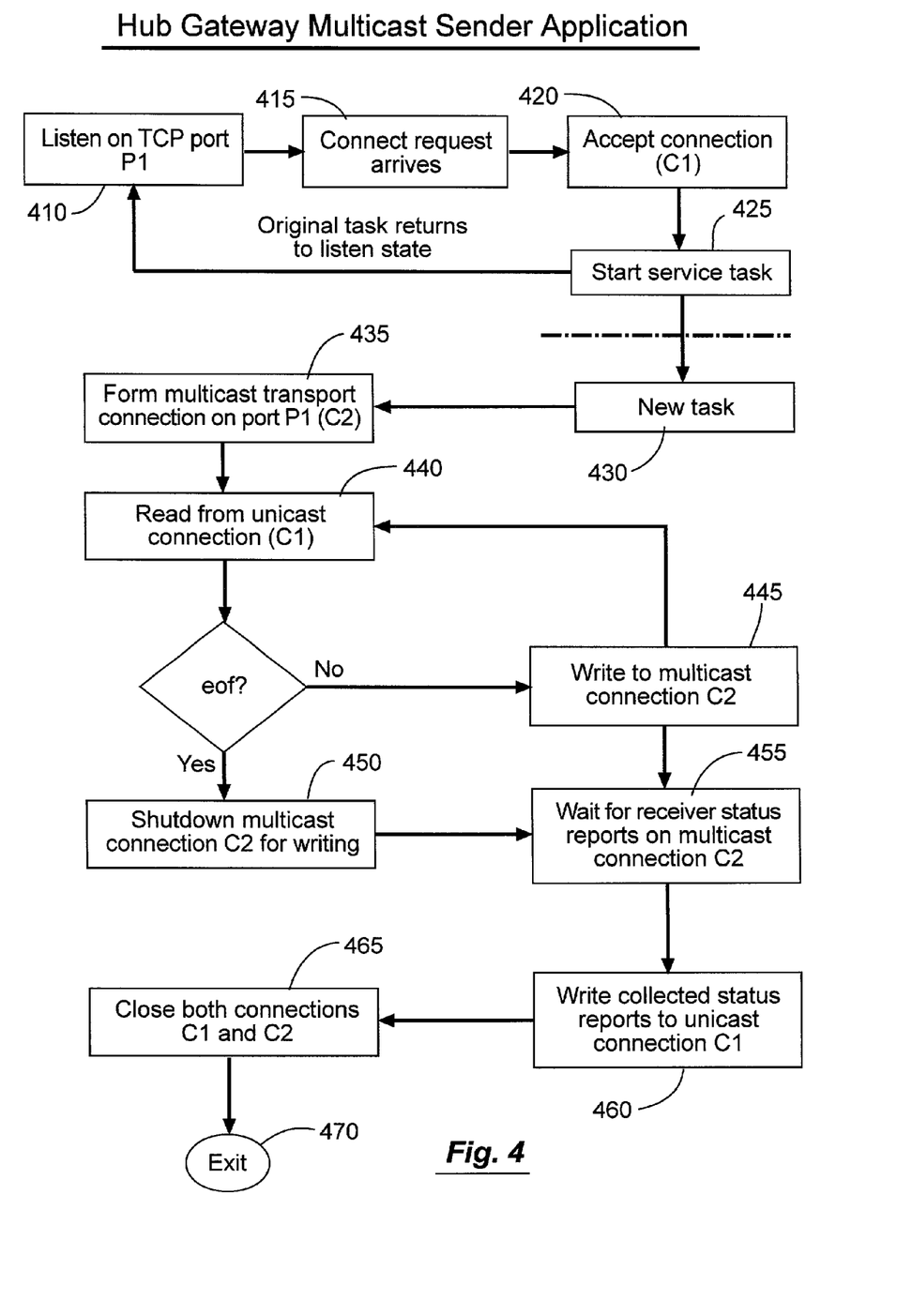
FIG. 4 depicts a flow chart for a hub gateway multicast sender application according to an embodiment of the present invention.
Figure 5:
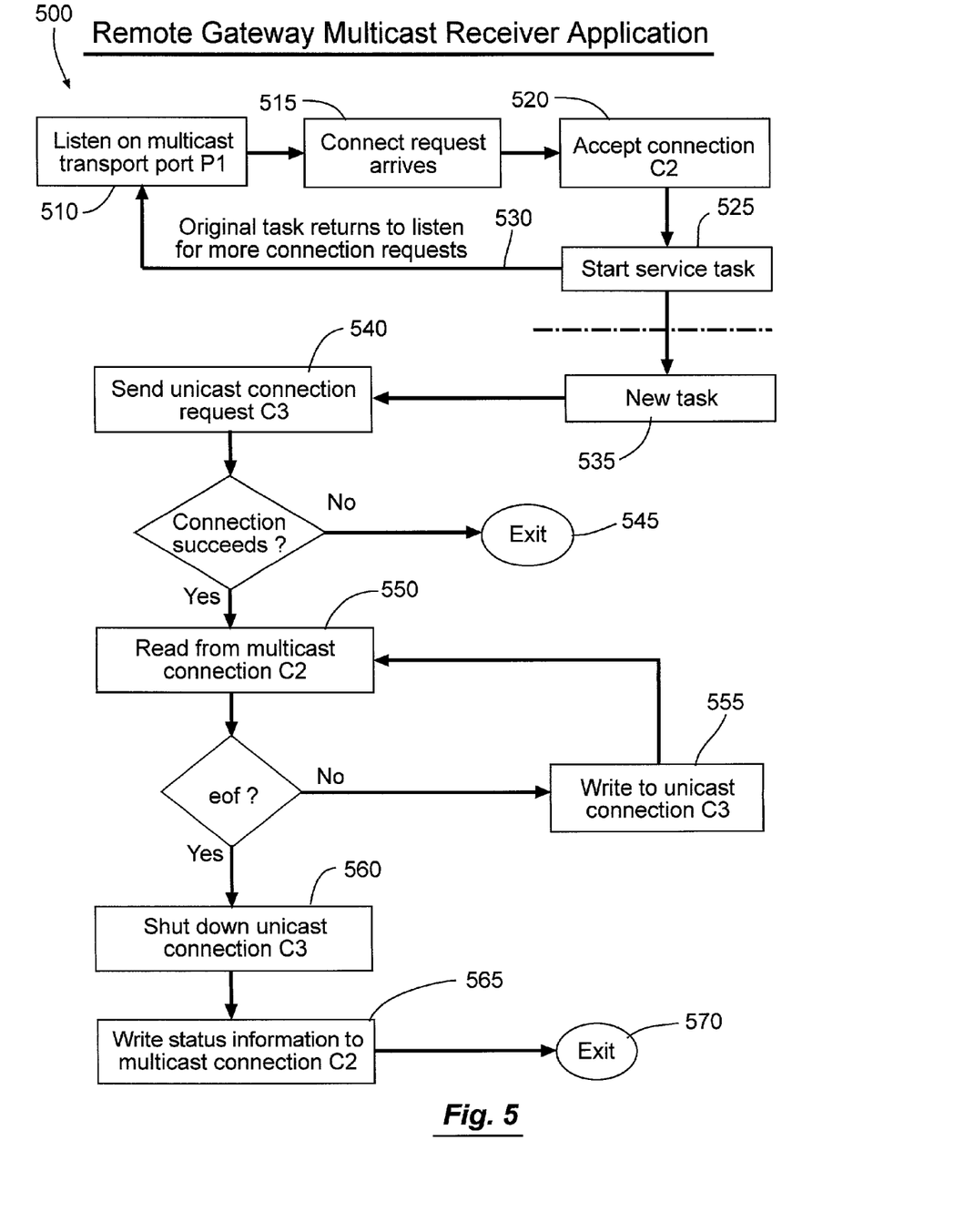
FIG. 5 depicts a remote gateway multicast receiver application for an embodiment of the present invention.

Turning now to FIGS. 4 and 5, methods of operating system 200 will be described.

More specifically, FIG. 4 depicts one embodiment of hub gateway 220 multicast sender application and FIG. 5 depicts one embodiment of remote gateway 250–254 multicast receiver application.

As shown in FIG. 4, hub gateway 220 listens on a unicast TCP port P1 (step 410) for a connection request. When the connection request arrives (step 415), the connection (C1) is accepted (step 420). A service task is started (step 425), and the original task returns to a listen state for further connection requests. After the initiation of a new task (step 430), a multicast transport connection (C2) is formed on port P1 (step 435). The method for forming the multicast group is dictated by the reliable multicast protocol being used, for example, modified XTP in one embodiment. Once the multicast transport connection has been formed, hub gateway 220 reads from the unicast connection C1 (step 440). In this manner, information and data received by hub gateway 220 from sender station 210 over unicast connection C1 is multicast over connection C2 to remote gateways 250–254.

During the unicast connection C1, hub gateway 220 continues to write to the multicast connection C2 (step 445). At the termination of unicast connection C1, hub gateway 220 shuts down the multicast connection C2 for writing (step 450). Hub gateway 220 waits for status reports on multicast connection C2 (step 455), with status reports being received from remote gateways 250–254. Collected status reports are written to unicast connection C1 (step 460). In one embodiment, status reports are written as data in the unicast connection C1, which in one embodiment is a TCP connection. Additional details on status reports of the present invention are provided below, in conjunction with FIG. 9. Both connections C1 and C2 are closed (step 465), and the multicast application is completed (step 470).

FIG. 5 depicts a schematic showing one embodiment of a remote gateway multicast receiver application 500 according to the present invention. Remote gateways 250–254 listen on the multicast transport port P1 (step 510). When a connection request arrives (step 515), the connection C2 is accepted (step 520) by one or more remote gateways 250–254 that have been listening for the IP multicast group address on port P1. The service task is started (step 525), and the original task returns to the listen configuration for more connection requests (step 530).

The new task (step 535) sends a unicast connection request C3 (step 540) to the affiliated end station 260–264. If the connection does not succeed, the multicast connection is terminated (step 545), and the service task exits. If the unicast connection succeeds, remote gateways 250–254 read from the multicast connection C2 (step 550), and data is written to unicast connections (C3, C4, . . . CN) between remote gateways 250–254 and end stations 260–264 (step 555). When multicast connection C2 is completed, unicast connections (C3, C4, . . . CN) are shut down (step 560). Remote gateways 250–254 write status information to multicast connection C2 (step 565) and the service tasks on remote gateways 250–254 exit (step 570).

In this manner, system 200 provides fast, efficient, and reliable multicast connections between network hub and remote sites. In one embodiment, a modified XTP connection is used for reliable multicast. In this manner, data that is lost or corrupted is retransmitted providing transfer reliability, and making special forward error correction software unnecessary.

In one embodiment, multicast functionality is built into the transport layer of applicants' SkyX protocol to facilitate fast, efficient, and reliable multicast connections. In this manner, the initial TCP connection may be converted into a multicast session, which permits the power of multicasting and the convenience of using TCP-based applications.

In another embodiment, systems and methods of the present invention will find use with file transfer protocol (FTP) applications. More specifically, the multicast facility of the present invention is designed to provide multicast fan-out functionality for use with FTP. The present invention multicast facility provides the ability to establish FTP connections, "put" multiple files, and obtain control and confirmation information. One embodiment of such a facility is discussed in conjunction with FIG. 6.

Figure 6:
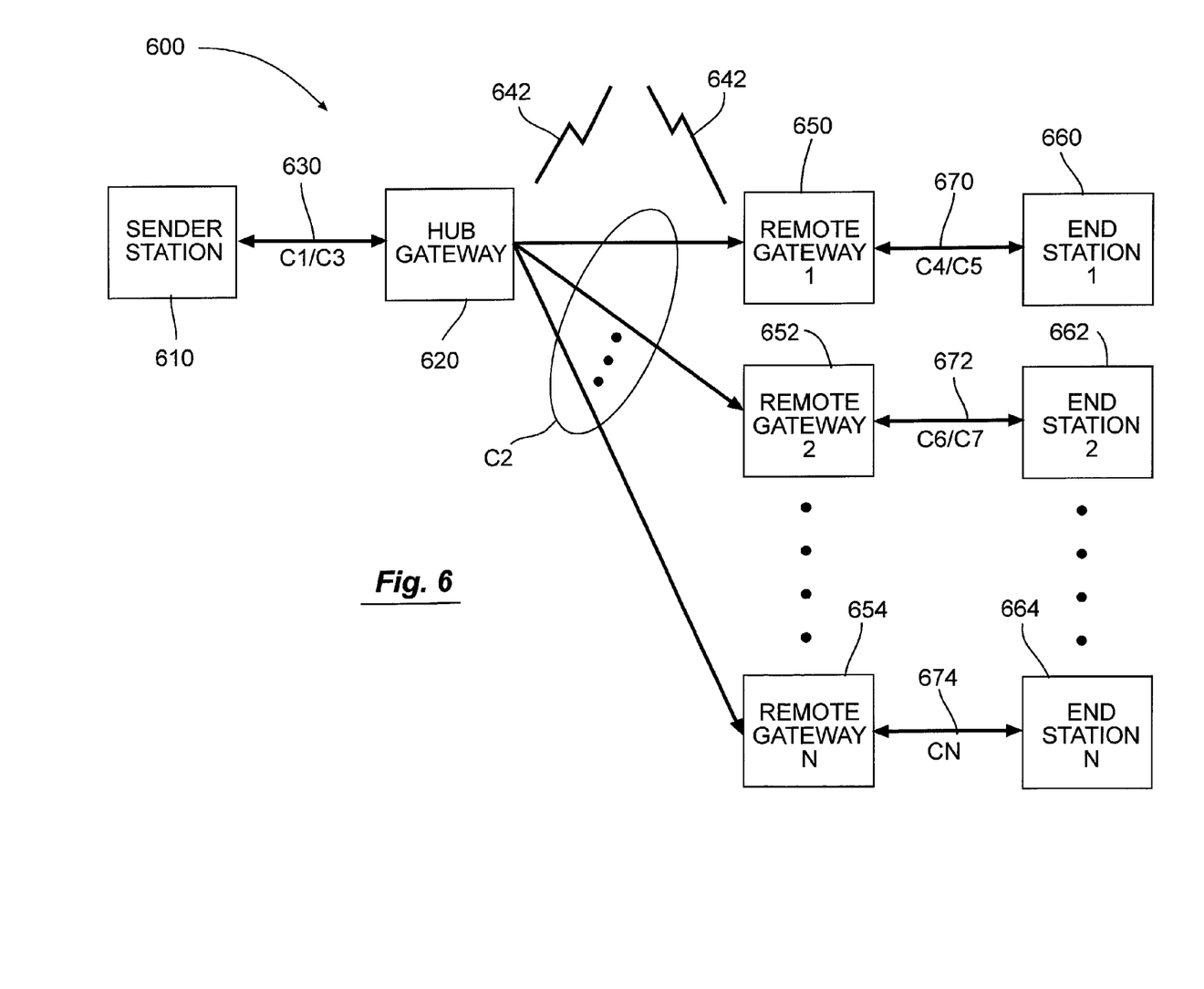
FIG. 6 depicts a simplified schematic of network and connection diagrams for FTP service according to the present invention.

System 600 includes a sender station 610 in communication with a hub gateway 620. As with system 200 described in conjunction with FIGS. 2–3, sender station 610 and hub gateway 620 may be connected by a LAN or WAN 630, over which a first connection (C1) may be established. Hub gateway 620 establishes a second connection (C2) with one or more remote gateways 650–654. Connection C2 may be via a WAN, a satellite connection as shown by link 642, or some combination thereof. Connection C2 is a multicast connection as will be further described. Each remote gateway 650–654 establishes a unicast connection with an end station 660–664. The unicast connections between remote gateway 650–654 and end stations 660–664 may be established via a LAN/WAN.

The FTP service is similar in functionality to a general transport multicast service, such as described in conjunction with prior Figures, but is further tailored to provide multicast distribution for a specific application. The FTP protocol is not unidirectional. FTP includes a control connection between a client and a server application, which provides for the exchange of commands and responses prior to file transfer. When FTP is used for data transfer over systems and according to methods of the present invention, a separate data connection is established. This connection is uni-directional. In this manner, a simple multicast data path over the satellite link using FTP is allowable.

In one embodiment, the FTP multicast service comprises two parts. The first part involves a sender running on a hub gateway 620, and the second part a receiver running on a remote gateway 650–654. Hub gateway 620 listens for TCP connections on the normal FTP service port, such as port 21. When a user initiates a FTP connection request to hub gateway 620 from any machine running the FTP application, hub gateway 620 accepts the connection and starts a multicast group session on a known IP group address and port number. The receivers on remote gateways 650–654 listen for the multicast group connections on the same IP group address and port number. When remote gateways 650–654 accept a connection and join a group, they initiate a unicast FTP connection to a configured IP destination address. The FTP connection to the designated end stations 660–664 use the preconfigured user name, password and file directory for end station 660–664. In one embodiment, the connections between remote gateways 650–654 and end stations 660–664 comprise unicast TCP connections. In this manner, a normal unicast FTP control connection is established to a final destination system, shown as end stations 1–N.

The receiver on remote gateway 650–654 is configured with a user name, password, and destination directory. These elements are used to establish an initial state on the control connections (C4, C6 and the like). In one embodiment, these elements are preconfigured in memory or on a disk at remote gateway 650–654, and sent over the individual unicast connections to end stations 660–664. Hub gateway 620 provides a subset of the services and commands of a normal FTP server, including the ability to service an FTP "put" command. Once the connections are established, the initiating user from sender station 610 issues commands to put files that are to be distributed over connection C3 to all of the destination systems at end stations 660–664. Hub gateway 620 processes these "put" commands by sending the file name over the multicast session, followed by the file data. The data is sent using a framing header so that remote gateways 650–654 can detect the end of a file and then look for a subsequent file without having to reform the multicast group for each file.

As each file header is received, remote gateway 650–654 issues a "put" command to its destination FTP server or end station 660–664. The FTP server or end station 660–664 will form a new data connection back to remote gateway 650–654 as represented by connection C5, C7 and like. The new data connection back to remote gateway 650–654 permits the file data to be written to that connection. To store copies of each file on multiple end stations at a single remote site, multiple copies of the receivers are run on the relevant remote gateway 650–654, with each configured with a different destination IP address. At the end of the transmission, hub gateway 620 reports to the FTP application at sender station 610 the IP address of all end stations 660–664 that received the data. Additional details on status reports are discussed in conjunction with FIG. 9.

Figure 7:
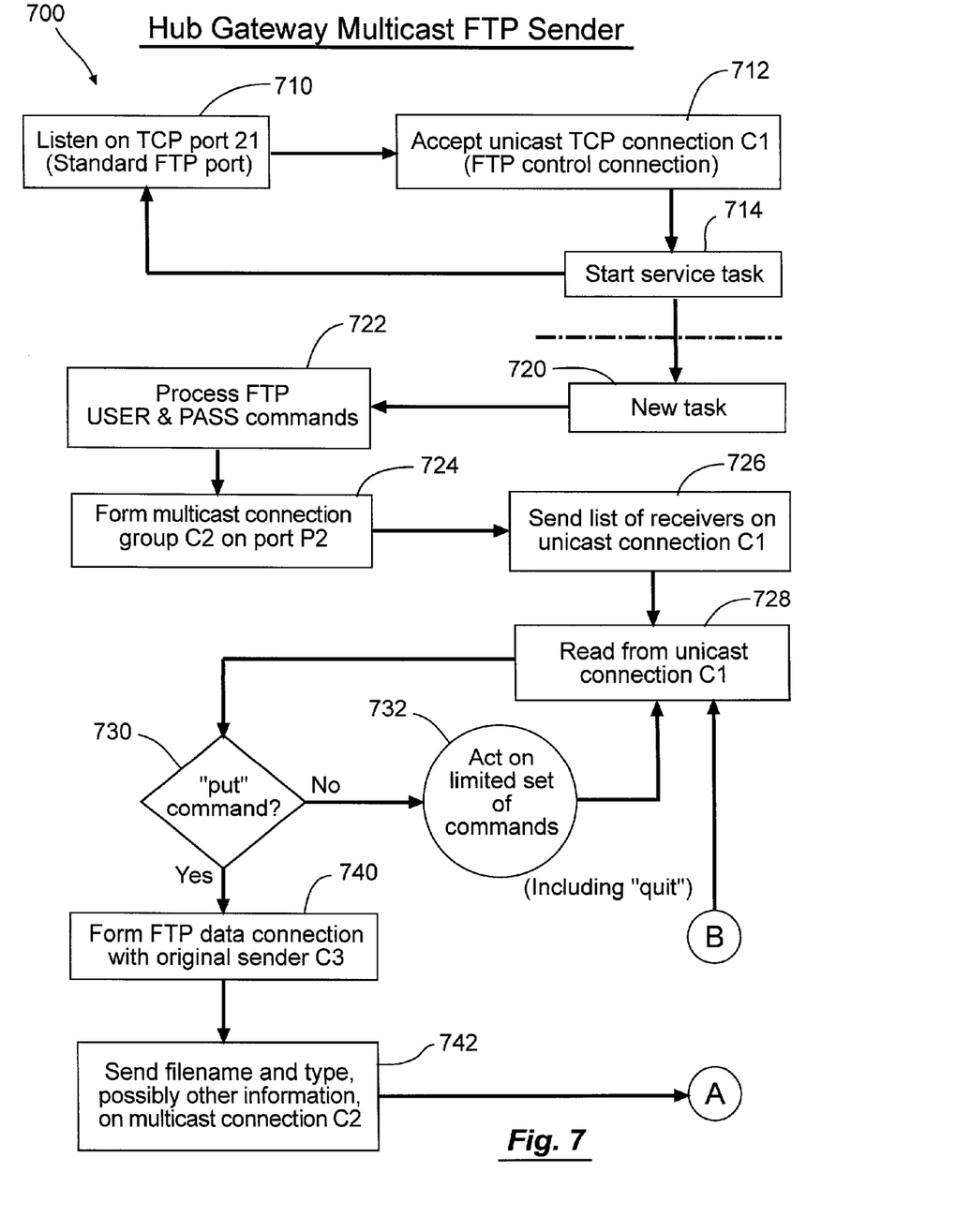
FIG. 7 is a flow chart indicating a hub gateway multicast FTP sender application according to an embodiment of the present invention.
Figure 8:
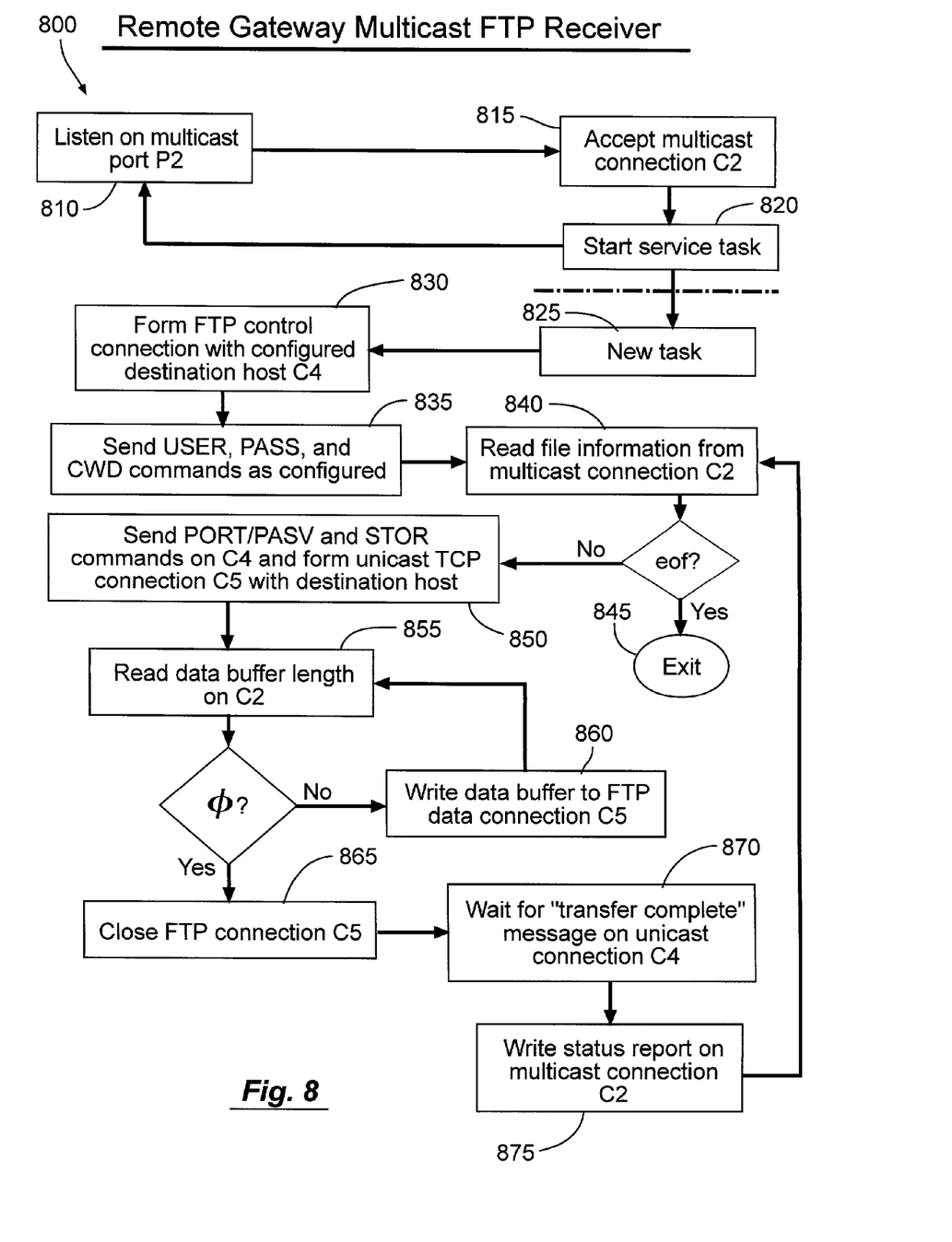
FIG. 8 depicts a flow chart of a remote gateway multicast FTP receiver application according to an embodiment of the present invention.

Turning now to FIGS. 7 and 8, a method of operating system 600 will be described. More specifically, FIG. 7 depicts one embodiment of hub gateway multicast FTP sender application, and FIG. 8 depicts one embodiment of remote gateway multicast FTP receiver application.

As shown in FIG. 7, hub gateway 620 listens on TCP port 21, the standard FTP port (step 710), although different ports may be used within the scope of the present invention. When a connection request is received, hub gateway 620 accepts the unicast TCP connection C1, thus establishing the FTP control connection (step 712). A new service task is started (step 714). The new task initiated (step 720) processes FTP user and password commands sent by the sender station (step 722). A multicast connection group C2 is formed on port P2 (step 724). It will be appreciated by those skilled in the art that multicast connection group C2 may be formed on alternative ports within the scope of the present invention.

Once multicast connection group C2 has been formed, a list of receivers is sent on unicast connection C1 (step 726) to sender station 610. Hub gateway 620 then reads from the unicast control connection (step 728) and acts on the command received. If the command received is not supported, hub gateway 620 returns a "command not supported" message to the FTP application on sender station 610. If a "put" command is initiated (step 730), an FTP data connection is formed with sender station 610, as shown by connection C3 (step 740). The file name and type, as well as possibly additional information, is then sent on multicast connection C2 to one or more remote gateways 650–654 (step 742). The data is read from connection C3 in a series of buffers. During the transmission, each buffer length is written to multicast connection C2 (step 750), and each buffer is written to multicast connection C2 (step 752).

At the end of the unicast transmission on connection C3, the FTP data connection C3 is closed (step 760). A zero buffer length is written to multicast connection C2 (step 762), and status reports are read from multicast connection C2 for all remote gateways 650–654 that participated in the multicast session (step 764). A file transfer complete message is then sent on unicast connection C1 with the status report and remote gateway receiver list (step 766). Hub gateway 620 then returns to read additional commands from control connection C1.

As shown in FIG. 8, one embodiment of a remote gateway multicast FTP receiver method according to the present invention will be described. Remote gateways 650–654 listen on multicast port P2, or other ports, for a multicast connection request (step 810). When a multicast connection request is received, it is accepted as connection C2 (step 815) and a service task is initiated (step 820). The new task (step 825) forms an FTP control connection with the configured destination host or end station 660, as shown by connection C4 (step 830). For the multicast embodiment, control connections (C4, C6, and the like) are established with each end station 660, 662, 664. Username, password and change working directory (CWD) commands are sent as configured (step 835), with the configured values stored on remote gateways 650–654 in one embodiment.

File information is read from multicast connection C2 (step 840), until the end of the multicast connection (step 845). During the multicast connection C2, PORT/PASV, and STOR commands are sent on connection C4, C6 and the like, and form the unicast TCP connections (C5, C7 and the like) with the appropriate destination host or end station 660–664 (step 850). One skilled in the art will recognize the FTP public specification terms such as PORT, PASV and the like for forming appropriate FTP connections. The data buffer length is read on connection C2 (step 855). If the data buffer length is not 0, the data buffer is written to FTP data connections (C5, C7 and the like). If the buffer length is 0, the FTP data connections (C5, C7 and the like) are closed. At the close of the FTP connections (C5, C7 and the like), remote gateways 650–654 wait for a FTP transfer complete message on unicast connections (C4, C6 and the like) (step 870). Upon receipt of the transfer complete message, a status report is written on multicast connection C2 for receipt by hub gateway 620 (step 875). The application then is available to read another file, without the need to restart the multicast group.

Remote gateways 650–654 hold open connections C4, C6 and the like to collect status on which end stations 660–664 received the data and/or file. Remote gateways 650–654 then return a final acknowledgment (ACK) to sender station 610 via hub gateway 620. In a particular embodiment, the acknowledgment includes an application specific message which may include IP addresses for some or all end stations 660–664 which received the data, confirmations that some or all end stations 660–664 received all of the intended data or files, and the like. In one embodiment, ACKs received from remote gateways 650–654 are consolidated and sent to sender station 610.

Figure 9A:
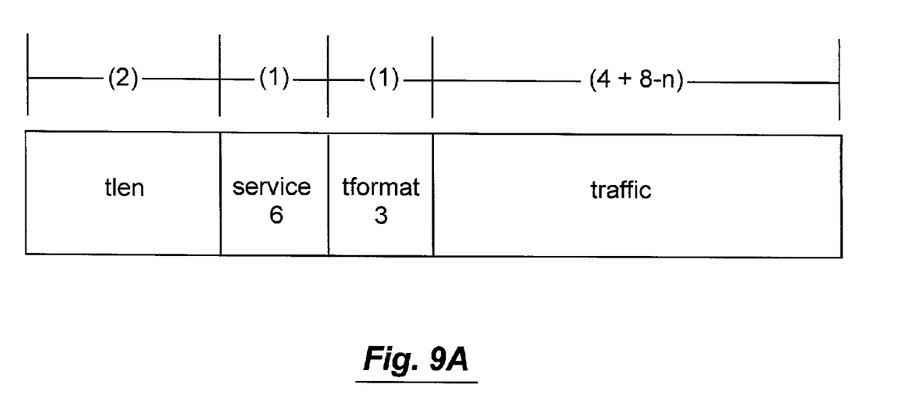
FIGS. 9A and 9B depict status report message packets from remote gateways to the hub gateway, and the response from hub gateway to remote gateway, respectively, according to the present invention.
Figure 9B:
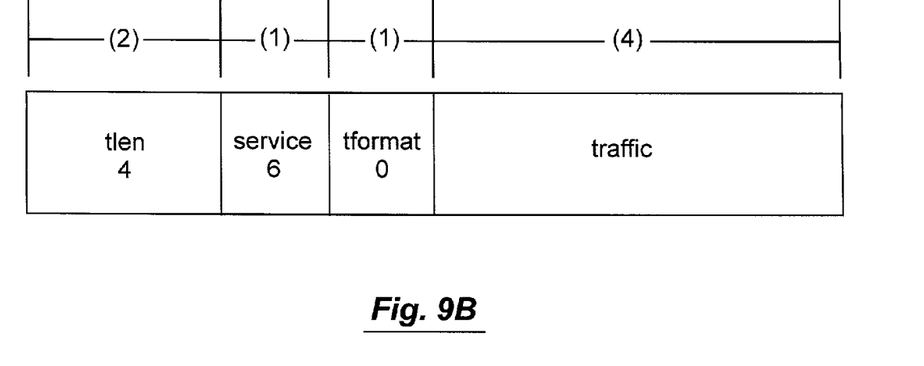

Turning now to FIGS. 9A and 9B, additional details on status reports according to the present invention will be described. As previously noted in discussing both the general multicast session and the FTP multicast session, status reports are returned by remote gateways 250–254 and 650–654 to hub gateways 220 and 620. In one embodiment, the status report messages consist of the form shown in FIG. 9A, representing an XTP TCNTL packet. This status report packet contains a standard XTP traffic specifier structure. The traffic specifier structure contains the four fields shown in FIG. 9A.

The first field (TLEN) contains the length of the traffic field. In accordance with XTP specification, a length of two bytes is used. The second field is the service field, a single byte in length. The service is set to six (6), which indicates a multicast service as specified by XTP protocol. The third field is the tformat field, also a single byte in length. In one embodiment, this value is set to three (3), to indicate the format of the traffic buffer. The fourth field is the traffic field, set to a minimum of four (4) bytes with an additional 0 or more eight (8) byte segments contained therein. Hence, the traffic field length is (4+8×N) bytes in length, with N ranging from zero (0) and up.

The TCNTL packet as shown in FIG. 9A is sent as a unicast packet from remote gateways 250–254 and 650–654 to hub gateways 220 and 620. An acknowledgment is requested from hub gateways confirming receipt of TCNTL packets (e.g., SREQ set in the XTP header). In one embodiment, hub gateways 220, 620 respond with a TCNTL packet acknowledgment containing a null traffic specifier, as shown in FIG. 9B. For example, the tformat is set to zero (0) and TLEN is set to four (4), with the traffic field being ignored. In this manner, hub gateways 220 and 620 acknowledge receipt of the status reports from remote gateways 250–254 and 650–654. If the remote gateway does not receive the TCNTL response from hub gateways 220 or 620, within a specified period of time based, in part, on the observed round trip time, the remote gateway retransmits the TCNTL packet shown in FIG. 9A. In one embodiment, remote gateways continue to resend the TCNTL status reports in the event the confirmation is not received from hub gateway. In another embodiment, in the event the acknowledgment requested from hub gateway is not initially received, remote gateways retransmit the TCNTL packet until received or a time-out limit is encountered.

One example of status reports for use with FTP service will be described. In one embodiment, a string containing the IP address of the recipient FTP end station 660–664, including at least one null byte at the end, is provided. For example, "10.1.1,1" would comprise 12 bytes, one for each ascii character and an ascii "0" at the end, plus an additional three (3) pad bytes to make a total of twelve (12) bytes. In this manner, the status report confirms not only the receipt of the multicast data, but also returns the IP address of end station 660–664 so that the FTP application on sender station 610 can document which end stations 660–664 received the desired data.

In one embodiment, in the general multicast service described in conjunction with FIGS. 2–5, a similar format to the FTP string described above is used. In addition to the fields shown in FIG. 9A, the recipient port number is also reported, for example, "10.1.1.1,123". In this manner, status reports provide desired information to sender stations 210 and 610.

The present invention hence provides exemplary multicast functionality for use with both general multicast and FTP multicast sessions. One advantage of the present invention is the avoidance of having specialized forward error correction applications which occupy additional bandwidth. Further, applications of the present invention do not necessitate the loading of software at each sender station and end station, as may otherwise be required. The present invention further provides a mechanism to report to the sender station which end stations actually received the data/file.

The present invention provides a substantially transparent multicast function which allows a TCP connection to be converted to a multicast session. The following chart provides test data illustrating significant reductions in transmission time and bandwidth utilization using the present invention. For example, over a 750 kilobit per second (Kbps) satellite link, sequential TCP transfers of a 25 megabit (MB) file to ten (10) remote sites takes in excess of two (2) hours to complete. Using the present invention, the same 25 MB file is transferred to ten (10) sites in two hundred and eighty (280) seconds, a reduction of ninety-six percent (96%). For a compressible file, the transfer time of the present invention is further reduced to sixty-six (66) seconds, resulting in a ninety-nine percent (99%) improvement compared with sequential TCP transfers. The amount the transmission time and bandwidth utilization are reduced by the present invention depend, in part, on the number of remote sites, the speed of the connecting link, the file size, and the like.

| Time to Transfer 25 MB file over 750 Kbps satellite link (with 500 milli-second round-trip delay) | | | |
| --- | --- | --- | --- |
| Number of remote sites | 1 | 5 | 10 |
| TCP unicast transfers | 730 sec | 3650 sec | 7300 sec |
| SkyX multicast transfer | 280 sec | 280 sec | 280 sec |
| SkyX multicast transfer with data compression | 61 sec | 66 sec | 66 sec |

The invention has now been described in detail for purposes of clarity and understanding. However, it will be appreciated that certain changes and modifications may be practiced within the scope of the appended claims. For example, methods of the present invention, as described herein and/or claimed below, may be incorporated by computer code maintained on a computer readable storage medium and executable by a processor located on hub gateways 220, 620 and/or remote gateways 250–254 and 650–654. Further, additional hardware may be included to establish connections between hub gateway and remote gateways via satellite links, including satellite modems, transmitters and receivers.

What is claimed is:

1. A method of establishing a multicast connection with a plurality of receiving stations, said method comprising:
   receiving a unicast, transport layer connection request from a sending station;
   wherein the unicast connection request includes a transport layer port identifier;
   establishing a unicast, transport layer connection with the sending station;
   mapping, using the transport layer port identifier, said unicast, transport layer connection request to a multicast connection on a multicast group network address; and
   initiating, in response to said unicast, transport layer connection request, said multicast connection to a plurality of receiving stations;
   wherein the unicast, transport layer connection and the multicast connection provide for the detection and retransmission of lost or corrupted data;
   wherein said multicast connection comprises a XTP connection.

2. The method as in claim 1 wherein said sending station comprises a computer.

3. The method as in claim 1, further comprising establishing, at the plurality of receiving stations, a plurality of second unicast connections with a plurality of end stations.

4. The method as in claim 3 wherein said unicast connection with said sending station comprises a first transport layer protocol, said multicast connection comprises a second transport layer protocol, and said second unicast connection comprises said first transport layer protocol.

5. The method as in claim 1 wherein said unicast connection with said sending station comprises a first transport layer protocol and said multicast connection comprises a second transport layer protocol.

6. The method as in claim 1 further comprising establishing a plurality of second unicast connections, each of said second unicast connections between a different one of said plurality of receiving stations and one of a plurality of end stations.

7. The method as in claim 1 wherein said multicast connection comprises a connection via a satellite link.

8. The method as in claim 1 wherein said multicast connection comprises a unidirectional data transfer.

9. The method as in claim 1 wherein said unicast connection with said sending station comprises a TCP connection.

* * * * *